United States Patent
Haavisto et al.

[11] Patent Number: 6,161,085
[45] Date of Patent: *Dec. 12, 2000

[54] METHOD AND ARRANGEMENT FOR ADDING A NEW SPEECH ENCODING METHOD TO AN EXISTING TELECOMMUNICATION SYSTEM

[75] Inventors: Petri Haavisto; Hannu Mikkola, both of Tampere, Finland

[73] Assignee: Nokia Telecommunications Oy, Espoo, Finland

[*] Notice: This patent is subject to a terminal disclaimer.

[21] Appl. No.: 09/068,163

[22] PCT Filed: Oct. 30, 1996

[86] PCT No.: PCT/FI96/00578

§ 371 Date: Oct. 9, 1998

§ 102(e) Date: Oct. 9, 1998

[87] PCT Pub. No.: WO97/16819

PCT Pub. Date: May 9, 1997

[30] Foreign Application Priority Data

Nov. 2, 1995 [FI] Finland .................................. 955267

[51] Int. Cl.[7] ............................ G10L 19/00; H04B 14/02
[52] U.S. Cl. ................................... 704/201; 704/270
[58] Field of Search ................................ 704/201, 270

[56] References Cited

U.S. PATENT DOCUMENTS

| | | | |
|---|---|---|---|
| 4,476,559 | 10/1984 | Brolin et al. | 370/522 |
| 5,768,613 | 6/1998 | Asghar | 712/35 |
| 5,822,360 | 10/1998 | Lee et al. | 375/200 |

FOREIGN PATENT DOCUMENTS

| | | | |
|---|---|---|---|
| 0 700 227 | 3/1996 | European Pat. Off. | H04Q 7/32 |
| 42 31 918 | 12/1993 | Germany | G10L 9/18 |
| 2 218 569 | 11/1989 | United Kingdom | H01L 27/06 |
| 2 218 596 | 11/1989 | United Kingdom | H04J 3/12 |
| 2 294 844 | 5/1996 | United Kingdom | H04Q 7/38 |

OTHER PUBLICATIONS

Patent Abstract of Japan, JP 7030947, Jan. 31, 1995.
Patent Abstract of Japan, JP 6006295, Jan. 14, 1994.

*Primary Examiner*—TăI. Šmits
*Attorney, Agent, or Firm*—IP Group of Pillsbury Madison & Sutro LLP

[57] ABSTRACT

A codec is introduced, according to a new speech encoding method, into a speech transmitting transceiver of a digital telecommunications system in order to use a "new" codec and an "old" codec in parallel in the system. A codec is selected by implementing a handshaking procedure between transceivers, handshaking, where a speech encoding method implemented in all transceivers and previously used in the telecommunications system concerned, is used at the beginning of each connection. At the beginning of a phone call and after handover, the method checks whether both parties can also use the new speech encoding. The handshaking messages have been selected so that their effect on the quality of speech is minimal, and yet so that the probability of identifying the messages is maximal.

16 Claims, 2 Drawing Sheets

METHOD AND ARRANGEMENT FOR ADDING A NEW SPEECH ENCODING METHOD TO AN EXISTING TELECOMMUNICATION SYSTEM

FIELD OF THE INVENTION

The invention relates to an arrangement for introducing a new, more advanced speech encoding method into a digital, speech transmitting telecommunications system.

DISCUSSION OF RELATED ART

A known method of selecting, for example, the speech encoding algorithm to be used is to agree on the speech encoding and signaling based on the basis of a standard or other such agreement. A new speech code (coder-decoder) can be arranged in an existing system afterwards, if the action has been anticipated in some way. In the field of telecommunications systems, however, no methods are known by which a new speech encoding method could be added to a existing system without making any changes in the standard or other agreement.

Based on the above introduction, the object of the invention is to provide a signaling method by which, for example, a new speech code can be introduced into an existing telecommunications system. The invention seeks to solve the problem that arises when the introduction of a new speech codec has not been ag reed upon and when a signaling system by which the communicating transceivers could select the method to be used does not exist. This is the situation, for example, with a GSM full rate channel.

The method of the invention thus has to solve two separate problems: (1) The new codec must operate on an existing channel. The transfer rate of a speech encoding method on a GSM full rate channel is 13 kbit/s. A solution to the problem is presented in Finnish Patent Application No. 943,302, entitled 'Method and equipment for transmitting speech in a telecommunications system' (Järvinen et al.). It is thus possible to apply a lower rate speech encoding method to this same channel. (2) When there are two possible speech codecs, how do two pieces of communication equipment select a method they both will use? Normally, the problem is solved by agreeing on signaling. However in unexpected situations, this is not possible. The problem is discussed in Finnish Patent Application No. 955,266. this application also discusses a signaling method that can be used in connection with the present invention.

An object of the invention is to develop a method and equipment implementing the method to solve the above problems.

SUMMARY OF THE INVENTION

The basic idea of the invention is that the speech codec to be used is selected by communication between transceivers on a speech channel. The method makes it possible, for example, to introduce into a GSM system, a better quality speech codec specific to the manufacturer, whereby the speech codec concerned i s only used when equipment of a specified manufacturer are communicating with each other. When the equipment communicate with equipment of other manufacturers, a standard GSM speech codec is used.

The procedure according to the invention is described as follows. Let us assume that both an 'old' (known to all) and a 'new' (known to new equipments) speech encoding method have been implemented in the communicating equipment. At the beginning of each speech connection, the old speech encoding method is used, since it is impossible to know for certain whether the new method has been implemented in the equipment used at the other end. A handover corresponds to the start of a connection because the network transceiver may change. The message transmission method according to the above-mentioned patent application (Haavisto) discusses how to initiate a dialogue between the transceivers to find out whether a new speech encoding method is used in both equipment. If so, then the equipment proceeds to use it.

The advantage of the method and system according to the invention is that although a new speech encoding method is introduced, the equipment previously used in the system can continue to use the old speech encoding method. The advantage is achieved so that an 'old' type receiver, which cannot interpret the bit patterns intended as messages, processes them as if they were normal speech frames. Since the speech frames that correspond to messages have zero amplitude, the messages only cause a 20 millisecond pause in speech, which cannot be heard by ear without careful, repeated reference tests.

BRIEF DESCRIPTION OF THE DRAWINGS

In the following, the invention will be described in greater detail in connection with preferred embodiments and with reference to the attached drawing, in which.

DETAILED DESCRIPTION OF THE CURRENTLY PREFERRED EMBODIMENTS OF THE PRESENT INVENTION

A new speech codec can be added to an existing telecommunications system, whereby a second, more advanced speech encoding method can be used in addition to the speech encoding method can be used in addition to the speech encoding method that is normally used in the system. The more advanced method can be used on a channel of an existing system by applying the method disclosed in Finnish Patent Application No. 943,302 (Järvinen et al.). If the more advanced speech codec operates at the same transmission rate as the codec used earlier in the system, then the method of patent application 943,302 (Järvinen et al.) need not be applied.

The problem is thus to select the speech codec such that even transceivers in which the second, more advanced speech encoding method has not be implemented, still operate in the system.

Figure 1:
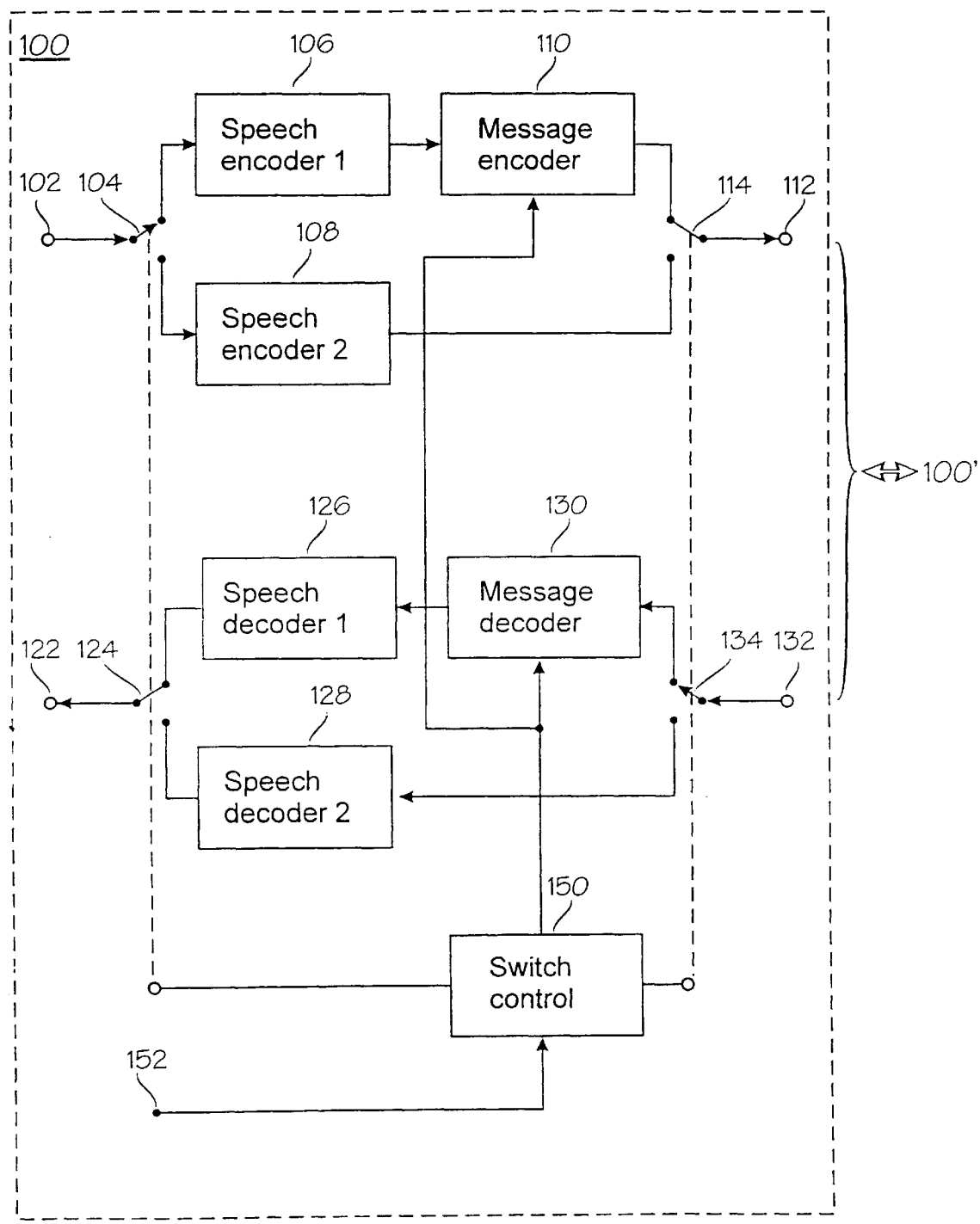
FIG. 1 shows parts of a telecommunications system of the invention.

FIG. 1 shows the essential parts of a transceiver 100 according to the invention. The arrangement according to the invention operates between two such transceivers.

A speech signal 102 to be transferred is conducted through a switch 104 to either of the two possible speech encoders. Speech encoder 1 (106) is a speech encoder using an 'old' speech encoding algorithm, whereas speech encoder 2 (108) uses a 'new' speech encoding algorithm. At the beginning of each speech connection, switch control logic 120 always supplies the incoming signal 102 to speech encoder 1 (106). From speech encoder 1, the speech encoding bits are transferred to a message encoder 110 presented in the above-mentioned, similarly assigned patent application (Haavisto). The encoder seeks to establish a signaling connection in accordance with the protocol agreed upon in the method with another, corresponding transceiver 100' (not shown). The protocol may vary greatly. In the simplest form, the message encoder 110 sends a code word agreed upon among speech encoding bits to notify the other communicating equipment. According to a more complicated, but more reliable protocol, several messages are sent between the transceivers 100, 100 and the message encoder 110 and a message decoder 130 of a transceiver must be in communication with each other. A notification transmitted in the simple protocol indicates that the equipments 100, 100' are able to use the new, more advanced speech encoding method. If transceiver 100 receives a similar notification from the other communicating party 100', the connection proceeds to use the new speech encoding method.

The speech encoding bits and possible message bits are supplied to a channel 112 through a switch 114. The position of switch 114 is controlled to be in line with the position of switch 104.

If the signaling protocol has been completed successfully and both communicating equipment are able to use the new speech encoding method, then the position of switch 104 is changed so that it conducts an incoming speech signal 102 to speech encoder 2 (108), from where the speech encoding bits are transferred directly through switch 114 to channel 112. Speech encoder 1 (106) is thus always used at the beginning of a connection when the transceivers have not yet agreed on switching to the new speech encoding method. After successful signaling, the transceivers use the new speech encoding method.

A receiver (122–132) of a transceiver receives incoming speech encoding bits through a channel 132 and a switch 134. If the use of a new speech encoding method has not yet been agreed on by signaling, then switch 134 conducts the signal to the message decoder 130. The decoder checks whether the received bits contain messages according to the protocol for switching to the use of a new speech encoding algorithm. From the message decoder 130, the speech encoding bits are supplied to speech decoder 1 (126), which inversely corresponds to speech encoder 1 (106). Speech 122 synthesized by the speech decoder is supplied through a switch 124, after which it is audible. If the new speech encoding algorithm is in use, then the bits obtained from channel 132 are supplied through switch 134 to speech decoder 1 (128), and the speech 122 synthesized by the decoder is supplied through switch 124, after which it is audible.

Switches 104, 114 . . . are controlled by switch control logic 150. The switches are set to use speech encoding algorithm 2 (new method) always when it has been confirmed by message encoding that the new method has been implemented in both communicating equipment. At the beginning of each new connection and after each handover, the switch control 150 receives a notification 152 that the equipment must switch to the use of the old speech encoding algorithm until it has been verified by signaling that the new speech encoding can be used.

Figure 2:
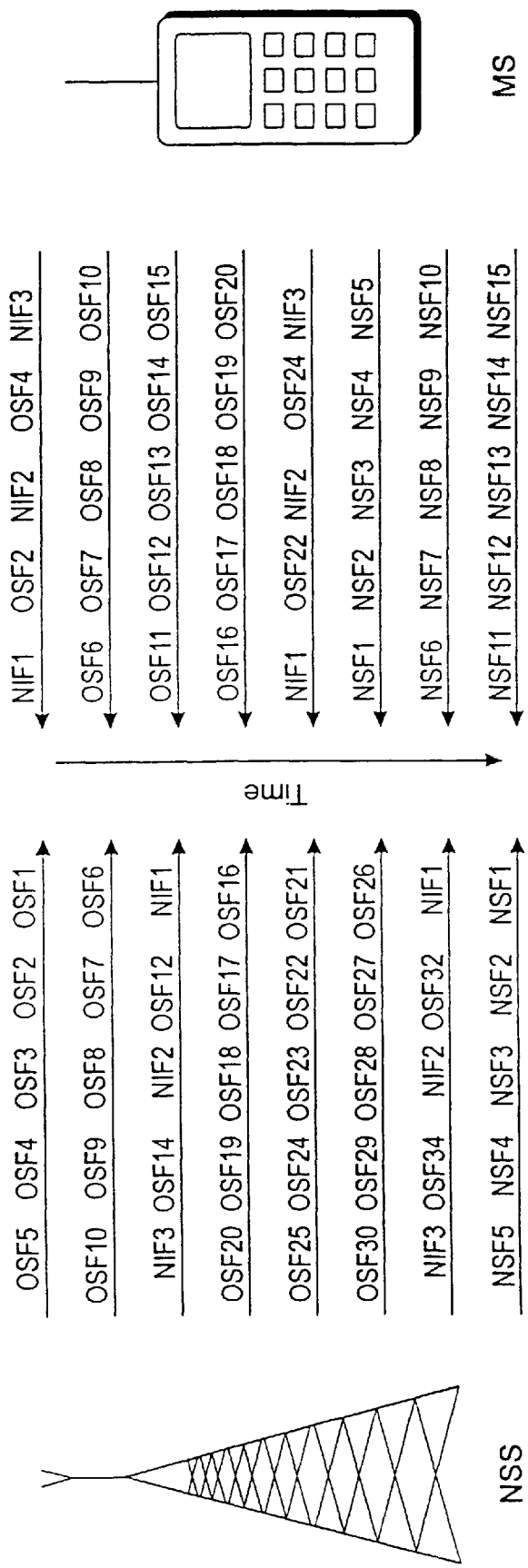
FIG. 2 shows, by way of an example, hand-shaking between two transceivers.

With reference to FIG. 1, we shall now describe an example for detailed handshaking between transceivers 100 and 100' according to FIG. 1. The first transceiver is, for example, a mobile station MS and network NSS (Network Subsystem). In FIG. 2, the following references are used. An 'old' codec means a general codec that is known for certain to be present in both the communicating equipments. A 'new' Codec, in turn, is a more advanced codec, the existence of which at the other end of the connection needs to b checked. A 'NIF-sequence') (New codec Identification Frame) is a sequence of speech frames notifying that its sender supports the new codec. A 'CIF-sequence' (Cancel handshake Identification Frame) is a sequence of speech frames notifying that its sender cancels the handshaking process, whereby the communicating equipment return to use the 'old' codec. Time instance T0 is the starting moment of the handshaking process, i.e., the moment when the mobile station MS sends the first frame of the NIF-sequence. Time instance T1 is the period at the beginning of a call and after the handover during which the network NSS waits for the first NIF-sequence. 'OSF' and 'NSF' are speech frames of the 'old' and 'new' codec, respectively, (Old Speech Frame; New Speech Frame).

The speech frames containing NIF and CIF-sequences are conventional speech frames of the 'old' codec, in which certain predefined bits have been set to conform to predefined bit patterns. Preferred bit patterns will be discussed later. The NIF and CIF-sequences should be designed so that the influence of the sequences on speech quality is minimal. The sequences, however, should be as reliably detectable as possible. In the tests conducted, the best compromise turned out to be a technique in which the NIF and CIF-sequences are distributed over five speech frames so that the bit patterns of the sequences are placed in the first, third, and fifth speech frame. The second and fourth speech frames are not changed in any way. The combined length of five speech frames is 100 ms. It is then highly unlikely that a whole sequence will be destroyed in conditions where a radio connection can be maintained.

Period T1 should be selected such that a speech frame encoded at time instance T0 is certainly received in network NSS within period T1.

The handshaking process starts at time instance T0 when the mobile station MS sends the sequence N1F1 OSF NIF2 OSF NIF3, where three bit patterns of the five speech frames have been distorted to implement handshaking.

If the handshaking has to be interrupted, this is effected by the sequence CIF1 OSF CIF2 OSF CIF3.

The following is a possible group of bit patterns for NIFn and Cin-sequences. Such bit patterns are discussed widely in the above-mentioned Finnish patent application. In brief, when the invention is applied in a GSM system, Block amplitude bits of these speech frames are set as zero, and 95 RPE bits protected by channel encoding are selected such that a mutual Hamming distance of different bit patterns is maximal.

The mutual Hamming distance of the bit patters can be maximized, for example, by the following selection. The 95 RPE bits of frame NIF1 are selected at random. These bits, however, should not form a completely regular 10101 pattern. In the event of such a pattern, a shafit of one bit in respect of time would produce some other code word belonging to the same group. Frame NIF2 is formed from NIF1 by inverting (logical NO) all bits except every third bit. Bits 1 and 2 are thus inverted, but bit 3 is not, etc. NIF3, in turn, is formed from NIF1 by inverting, for example, bits 1, 4, 7, etc. The procedure three code words the Hamming distance of which is 63 bits.

CIF-sequences can be formed so that CIF1 is formed by inverting all the bits of NIF1. CIF2 and CIF3 are formed from CIF1 in the same way as NIF2 and NIF3 were formed from NIF1. The resultant NIF1-NIF3 and CIF-CIF3 form a group of six code words, within which the code words differ from one another as much as possible, i.e., their Hamming distance is maximal. When the invention is applied to a system in which a different number of code words, e.g., 2N code words, are needed, the above procedure is used such that instead of the third bit, every Nth bit is used.

In the following, an entire handshaking process involving a change of a speech codec is described with reference to FIG. 2. Handshaking takes place for example, in the following stages. At time instance T0, the mobile station MS sends a NIF-sequence of the first five frames: NIF_MS1. The network NSS identifies the sequence and responds by sending a similar NIF-sequence: NIF_NS1. The mobile station MS identifies the response. It has now been detected that both communicating equipment can use the 'new' codec. The next step is to synchronize the change of codec. The next step is to synchronize the change of codecs in both directions, so that the receiving party will use a decoding algorithm intended for each speech frame.

Exactly NW (Number of Wait) frames after the first NIF_MS1 frame, the mobile station MS sends a second NIF-sequence NIF_MS2 and proceeds to use the new codec. If problems do not arise, the second NIF-sequence NIF_MS2 is unnecessary, since the number of frames between NIF_MS1 and the first speech frame encoded by the new codec is known. Likewise, the network NSS waits for NW frames after sending a NIF_NS1 sequence, after which it sends a second NIF-sequence (NIF_NS1) and proceeds to use the new codec.

The handshaking must be repeated at the beginning of each phone call and in connection with each handover. A handshaking process at the beginning of a new phone call is very simple, since both parties start a connection using the 'old' codec. A handover is slightly more completed. When a new codec is used, both parties must switch to the old codec. The switch must be synchronized so that the last speech frame sent to the codec used before the handover is encoded by the 'new' codec, and the first one sent to the codec used after the handover is encoded by the 'old' codec. The 'old' and 'new' codec here refer to a generic and a more advanced codec, respectively, and not to the difference prevailing between the situations before and after the handover.

Above is described a situation where both parties of a connection are 'new' in type, as regards the invention, i.e., they contain an 'old' and a 'new' codec. If a mobile station is 'old' in type, no handshaking takes place, no matter which type the network NSS is. Instead, if the mobile station MS is 'new' in type but the network NSS is 'old', then the mobile station MS sends the network NSS a NIF-sequence. Since the network does not respond within NW frames (NW being, e.g., 15), the mobile station MS send a CIF-sequence canceling the handshaking.

The handshaking algorithm of the mobile station MS can be described by the following steps:

1. sending a NIF-sequence (NIF_MS1) at a time instance T0;
2. monitoring for the duration of NW frames whether the network responds by a NIF-sequence (NIF_NS1);
3. in response to the network not responding with a NIF-sequence, sending a CIF-sequence exactly NW frames after the last frame of the NIF-sequence of the mobile station; and in response to the network responding with a NIF-sequence, sending a second NIF-sequence exactly NW frames after the last frame of the NIF-sequence of the mobile station;
4. interpreting the frame received from the network exactly NW frames after NIF_NS1 as being either a CIF or NIF_NS2-sequence;
5. in response to the frame having been interpreted as a CIF-sequence, sending a CIF-sequence exactly NW frames after the last frame of the second NIF-sequence of the mobile station and continuing to use the 'old' codec; and in response to the frame having been interpreted as a NIF_NS2-sequence, proceeding to use the new codec.

From the side of the network, handshaking can be described by the following steps:

1. waiting a time period T1 or until a NIF-sequence (NIF_MS1) sent by a mobile station is detected;
2. in response to a NIF-sequence not being detected during the time period T1, terminating the handshaking; and in response to a NIF-sequence being detected, sending a first NIF-sequence (NIF_NS1 as a CIF or a NIF_MS2-sequence;
3. interpreting the frame received from the mobile station exactly NW frames after NIF_NS1 as a CIF or a NIF_MS2-sequence;
4. in response to the frame being interpreted as a CIF-sequence, sending a CIF-sequence exactly NW frames after the last frame of the first NIF-sequence of the network and continuing to use the 'old' codec; and in response to the frame being interpreted as a NIF_MS2-sequence, sending a second NIF-sequence (NIF_NS2) exactly NW frames after the last frame of the first NIF-sequence of the network and proceeding to use the new codec;
5. interpreting the frame received from the mobile station exactly NW frames after NIF_MS2 as either a CIF-sequence or a normal speech frame;
6. in response to the frame having been interpreted as a CIF-sequence, immediately returning to use the old codec.

The following is a description of the effect of handshaking on a normal conversation. If a mobile station is 'new', but the network is 'old', then the mobile station first sends a NIF-sequence and then, NW frames later, a CIF-sequence. The network then receives three bad speech frames twice, with intervals of 0.3 seconds. Since the Block amplitude parameters are zero, the effect of these frames cannot be heard by ear without careful, repeated reference tests. A simulated test in which a mobile station repeats a handshaking process relating to handover at an interval of two seconds impairs the quality of speech somewhat but not decisively.

When both the parties are 'new', two NIF-sequences are sent in both directions. The effect on the quality of speech is the same as above. The effect, however, can be reduced by employing a bad-frame replacement technique, with regard to which reference is made to the above-mentioned Finnish patent application to FIG. 6 and the description thereof.

In the following, we shall discuss optimal tolerance for identification of NIF and CIF-sequences. Since the sequences are identified using bits protected by channel encoding, they are very likely to be received faultlessly. One cannot rely on this, however, but an allowed number of defective bits should be defined. If the tolerance is too low, a sequence may not be identified. If it is too high, on the other and, a normal speech frame may be erroneously identified as a handshaking sequence. A suitable compromise is, for example, 5 defective bits. With this tolerance, there is a 99.8% probability that any one of the three frames NIF1–NIF3 (or, correspondingly, CIF1–CIF3) will be identified even under conditions that are so bad that the amount of defective bits is 1% even after channel encoding. Theoretically, the probability of losing all the three sequences would be $10^{-30}$.

When the first NIF-sequences have been received, the following sequences can be identified much more easily. It is sufficient that the NIF and CIF-sequences can be differentiated from one another. Since the bits differ from one another with respect to at least 60 bits, the differentiation may take place, if the amount of defective bits after channel encoding is less than 50%.

It should be understood that the embodiments of the invention, including the figures and their description, are intended to illustrate rather than restrict the invention. For example, the switches described in connection with FIG. 1 are only one possible implementation. Alternatively, signals can be supplied to both encoders and corresponding decoders provided with an activation input. The control logic of a switch would here function such that when a selection is made between an 'old' and a 'new' codec, the relevant codec is activated and the other codec is deactivated.

To present a concrete embodiment, the invention has been described, by way of an example, in connection with the selection of a GSM speech codec. The invention is naturally not limited to this, but can also be applied in other corresponding telecommunications systems, and even in the GSM system it can also be applied to other functions than the selection of a speech codec. For example, as telefax functions become more common in mobile stations, two transceivers can agree on the telefax protocol to be used by a handshaking process of the present invention.

It is obvious to a person skilled in the art that with the advancement of technology, the basic idea of the invention can be implemented in various ways. The invention and its embodiments are thus not limited to the examples described above but they can vary within the scope of the claims.

What is claimed is:

1. A method of selecting a first or a second speech codec between a first and a second transceiver in a telecommunications system, the method in comprising:

at the beginning of a connection, transceivers use the first codec;

when a connection has been established, the first transceiver send the second transceiver a message contained in a speech frame, the first transceiver inquiring by the message, whether the second transceiver is able to use the second speech codec;

in response to the message sent by the first transceiver, the second transceiver sends the first transceiver a message contained in a speech frame stating that it is able to use the second speech codec, after which the second transceiver proceeds to use the second speech codec; and in response to the message sent by the second transceiver, the first transceiver proceeds to use the second speech codec.

2. The method according to claim 1, characterized in that wherein, in connection with a handover, the first and second transceivers return to use the first speech codec.

3. The method according to claim 1, wherein the messages between the first and the second transceiver are predetermined bit groups sent in the speech frames of a digital telecommunications system, the number of the bit groups being small as compared with the number of possible bit groups, preferably of the order of 10; and the bit groups are formed such that the speech volume of the speech frame corresponding to the message is essentially zero and at least some of the remaining bits of the speech frame are divided between the different messages such that the Hamming distance between the message is maximal.

4. The method according to claim 3, wherein the bit group corresponding to the message is arranged in apart of the speech frame that in the system used is protected against transmission errors.

5. The method according to claim 3, wherein a speech frame is interpreted as a message, if its speech volume is essentially zero and if some other part of the speech frame differs from the predetermined bit group corresponding to the message by at most a predetermined threshold value preferably by five bits.

6. The method according to claim 3, wherein the method is used in connection with OSM full rate speech encoding;

wherein the amplitude of a received speech frame is minimized by setting Block amplitude parameters of the speech frame to be sent essentially to zero; and wherein setting the bit group corresponding to the message in the bits corresponding to RPE parameters of the speech frame.

7. The method according to claim 1, wherein the messages between the transceivers are divided into several, preferably three, partial messages, and that successful reception of a certain subgroup, preferably one partial message, is interpreted as successful reception of an entire message.

8. The method according to claim 7, wherein at least one ordinary speech frame is sent between the partial messages.

9. Equipment for selecting a first and a second speech encoder in a first transceiver and a second transceiver of a telecommunications system, the equipment comprising:

means for establishing a speech connection by using the first codec at the beginning of the connection;

means for inquiring whether the second transceiver can use the second speech codec;

means of receiving the response sent by the second transceiver; and mean responsive to the affirmative response of the second transceiver; and means responsive to the affirmative response of the second transceiver, for continuing the speech connection by using the second speech codec.

10. Equipment according to claim 9, wherein the messages between the first and the second transceiver are predetermined bit groups sent in speech frames of a digital mobile system, the number of the bit groups being small as compared with the number of possible bit groups, preferably of the order of 10; and the bit groups are formed such that the speech volume of the speech frame corresponding to the message is minimal and the remaining bits of the speech frame are divided between different messages so that the Hamming distance between the messages is maximal.

11. Equipment according to claim 10, wherein the equipment is used in connection with GSM fill rate speech encoding, and wherein the speech volume is minimized so that the Block amplitude parameters of the speech frame are essentially zero.

12. Equipment according to claim 9, wherein the messages between the transceivers are divided into several, preferably three, partial messages, and wherein the equipment is arranged to interpret successful reception of a certain subgroup, preferably one partial message, as successful reception of an entire message.

13. Equipment according to claim 12, wherein the equipment is arranged to send at least one ordinary speech frame between the partial frames.

14. A GSM speech frame signal, wherein, in order to send messages on a speech channel, the Block amplitude parameters of the speech frame corresponding to the moment of transmission are essentially zero, but the RPE parameters fire not zero.

15. The OSM speech frame signal according to claim 14, wherein, to improve immunity to interference, the Block amplitude parameters of the speech frame are zero and the RPE parameters are bit groups deviating from zero, so that each message is corresponded to by a different bit group and that Hamming distance between the bit groups is maximal.

16. The GSM speech frame signal according to claim 14, wherein, to improve immunity to interference,
- the Block amplitude parameters of a certain subgroup, preferably three speech flames, of some, preferably five, speech frames, are zero, and the RPE parameters are bit groups deviating from zero; and
- between the so changed speech frames there is a small quantity of normal speech frames, preferably one normal speech frame.

* * * * *